Dec. 2, 1924. 1,517,374
M. J. MILMOE
STAPLING MECHANISM FOR BOX FORMING AND STAPLING MACHINES
Original Filed March 1, 1917 10 Sheets-Sheet 1

INVENTOR.
MICHAEL J. MILMOE.
BY
ATTORNEYS.

Dec. 2, 1924.

M. J. MILMOE 1,517,374

STAPLING MECHANISM FOR BOX FORMING AND STAPLING MACHINES

Original Filed March 1, 1917   10 Sheets-Sheet 2

INVENTOR.
MICHAEL J. MILMOE.
BY
ATTORNEYS.

Dec. 2, 1924.

M. J. MILMOE 1,517,374

STAPLING MECHANISM FOR BOX FORMING AND STAPLING MACHINES

Original Filed March 1, 1917    10 Sheets-Sheet 4

INVENTOR.
MICHAEL J. MILMOE.
BY
ATTORNEYS.

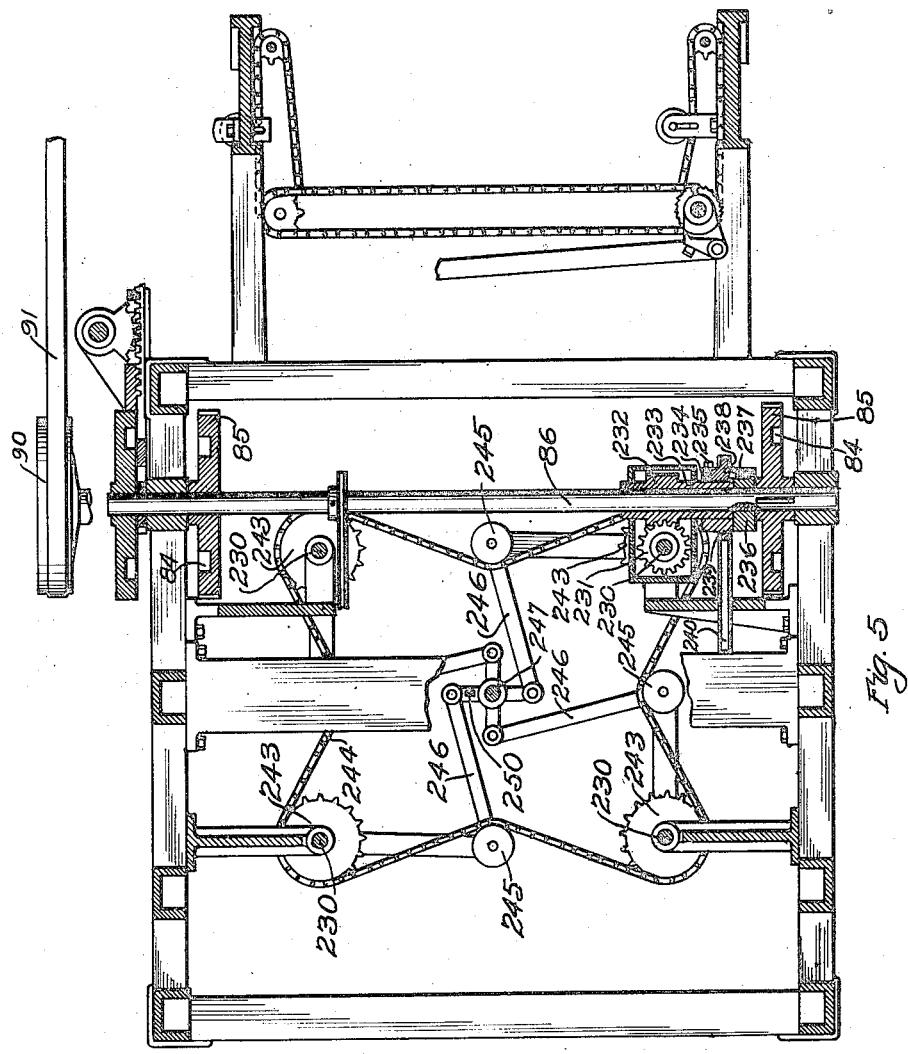

Dec. 2, 1924.                                                1,517,374
M. J. MILMOE
STAPLING MECHANISM FOR BOX FORMING AND STAPLING MACHINES
Original Filed March 1, 1917    10 Sheets-Sheet 6
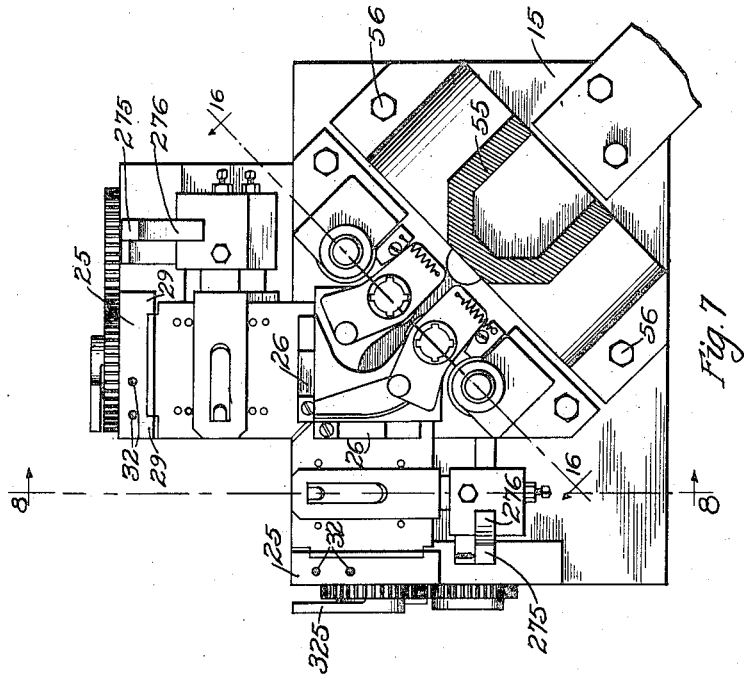
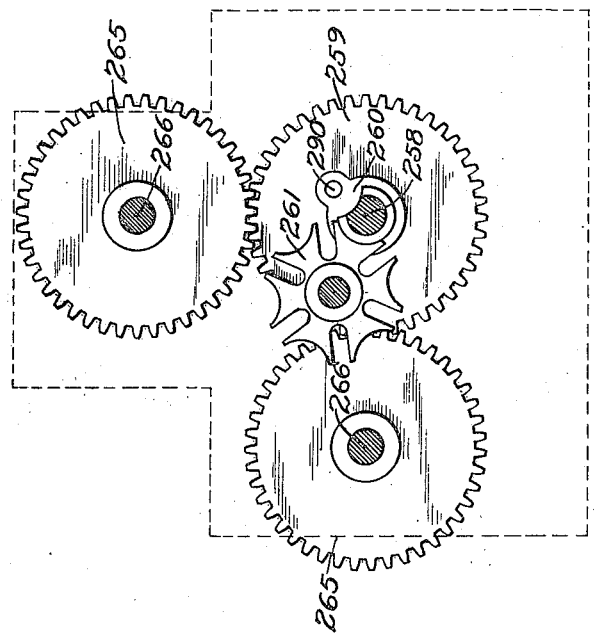
INVENTOR.
MICHAEL J. MILMOE
BY
ATTORNEYS.

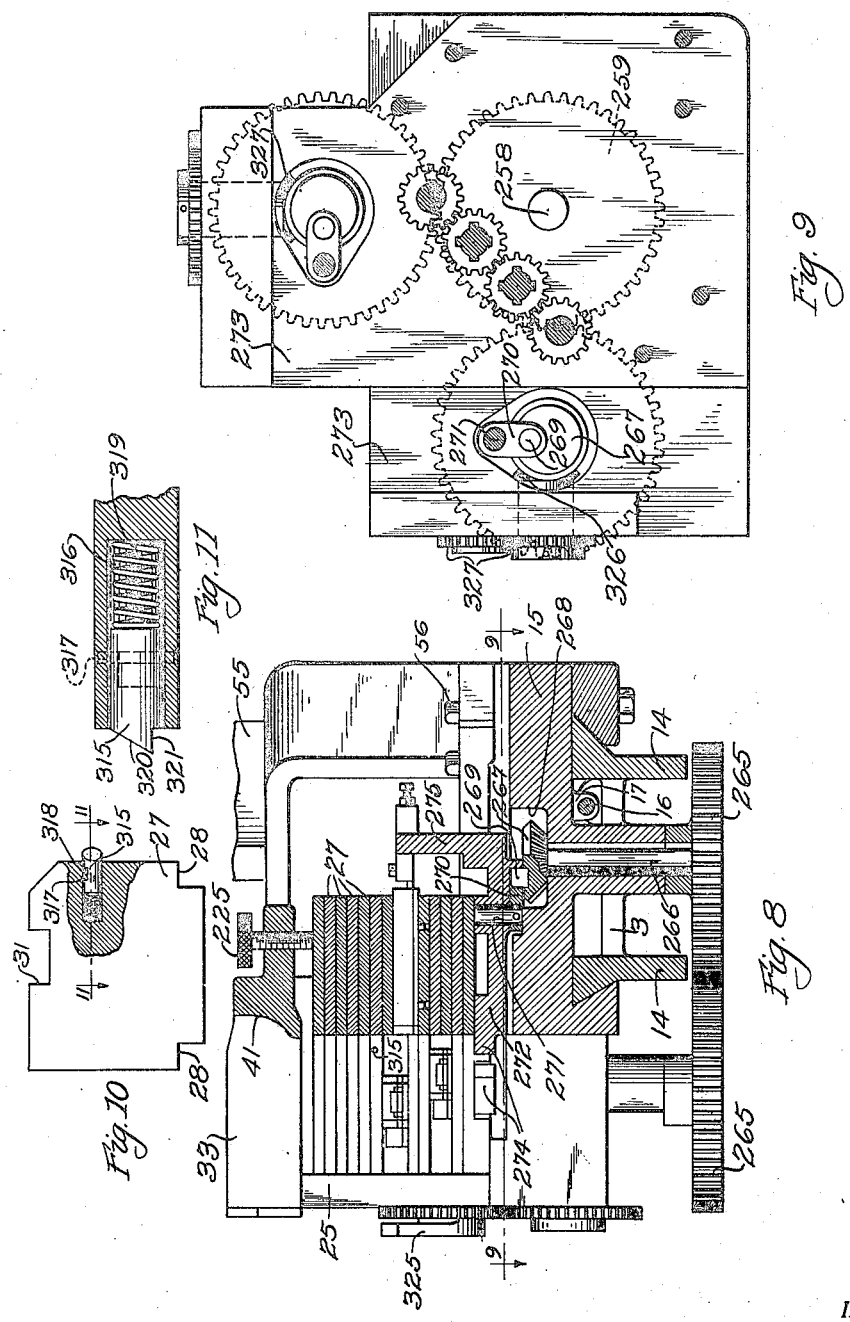

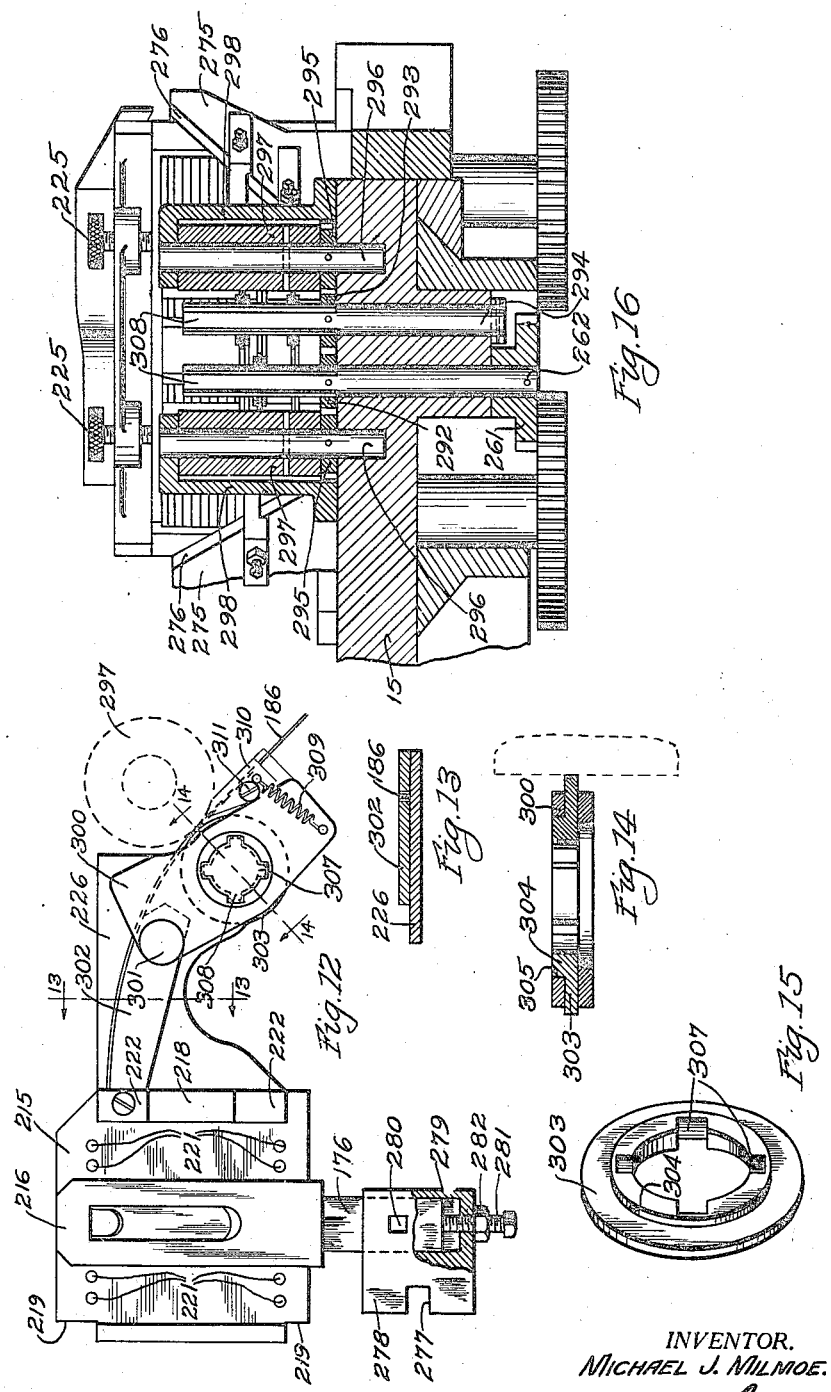

INVENTOR.
MICHAEL J. MILMOE.
BY Nissen & Crane
ATTYS.

Dec. 2, 1924. 1,517,374
M. J. MILMOE
STAPLING MECHANISM FOR BOX FORMING AND STAPLING MACHINES
Original Filed March 1, 1917    10 Sheets-Sheet 10
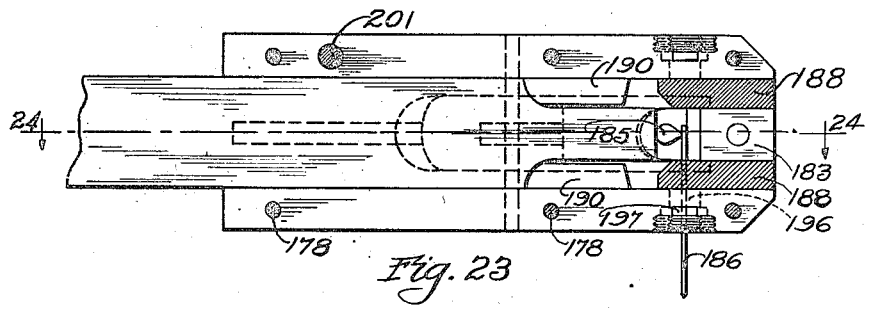
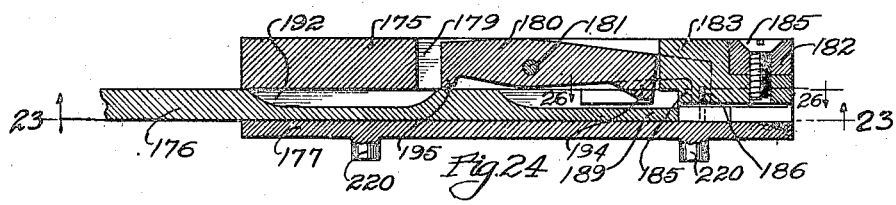
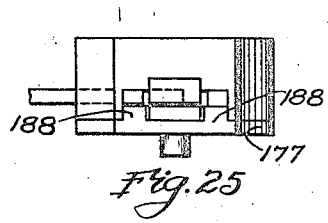 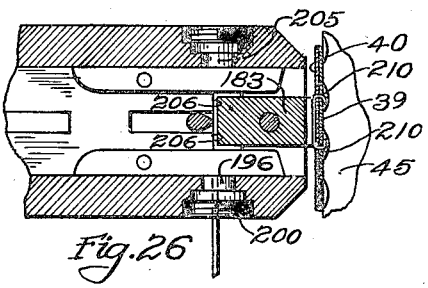
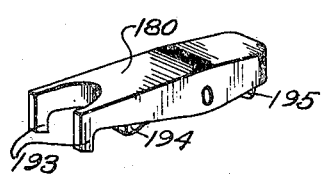 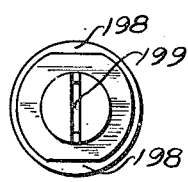 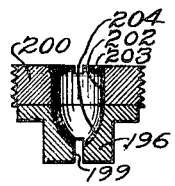 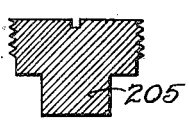
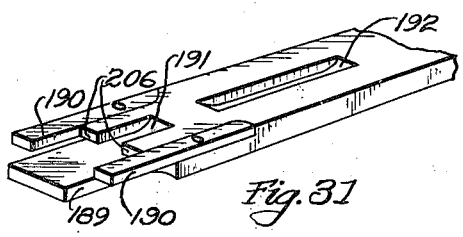
INVENTOR.
MICHAEL J. MILMOE.
BY
ATTORNEYS.

Patented Dec. 2, 1924.

1,517,374

UNITED STATES PATENT OFFICE.

MICHAEL J. MILMOE, OF CHICAGO, ILLINOIS, ASSIGNOR TO F. B. REDINGTON COMPANY, OF CHICAGO, ILLINOIS, A CORPORATION OF ILLINOIS.

STAPLING MECHANISM FOR BOX FORMING AND STAPLING MACHINES.

Original application filed March 1, 1917, Serial No. 151,656. Divided and this application filed July 26, 1920. Serial No. 399,217.

*To all whom it may concern:*

Be it known that I, MICHAEL J. MILMOE, a citizen of the United States, residing at Chicago, in the county of Cook and State of Illinois, have invented certain new and useful Improvements in Stapling Mechanism for Box Forming and Stapling Machines, of which the following is a specification.

This invention relates to machines for forming boxes from blanks, and more especially to the stapling mechanism of such machines, and has for its object the provision of a device of the character named which shall be of improved construction and operation.

The invention is exemplified in the combination and arrangement of parts shown in the accompanying drawings and described in the following specification, and it is more particularly pointed out in the appended claims.

This application is a division of application Serial No. 151,656, filed March 1, 1917.

In the drawings—

Fig. 5 is a horizontal sectional view substantially on line 5—5 of Fig. 2.

Fig. 6 is a detail horizontal sectional view showing the intermittent drive for the wire feed.

Fig. 7 is a horizontal sectional view showing the stapling mechanism for one corner of a box.

Fig. 8 is a vertical sectional view on line 8—8 of Fig. 7.

Fig. 9 is a horizontal sectional view substantially on line 9—9 of Fig. 8, but showing parts not shown in that figure.

Fig. 10 is a plan view of one of the blocks used for holding the stapling mechanism in adjusted positions with part broken away to show one of the box strippers.

Fig. 11 is a fragmentary sectional view on line 11—11 of Fig. 10 showing the stripper in detail.

Fig. 12 is a detail plan view showing one of the stapling units.

Fig. 13 is a detail sectional view on line 13—13 of Fig. 12.

Fig. 14 is a detail sectional view on line 14—14 of Fig. 13.

Fig. 15 is a perspective view of a wire feeding roller.

Fig. 16 is a fragmentary sectional view on line 16—16 of Fig. 7.

Fig. 23 is a sectional view of one of the stapling heads, the section being taken on line 23—23 of Fig. 24.

Fig. 24 is a vertical sectional view of a stapling head on line 24—24 of Fig. 23.

Fig. 25 is an end elevation of a stapling head looking from the right in Fig. 23.

Fig. 26 is a detail sectional view on line 26—26 of Fig. 24.

Fig. 27 is a perspective view of the staple shifting lever forming a part of the stapling mechanism.

Fig. 28 is an end elevation, and Fig. 29 a section respectively of the wire guide for the stapling head.

Fig. 30 is a section of a wire stop plug for the stapling head; and

Fig. 31 is a perspective view of the forward end of the staple forming and driving plunger.

Figure 1:
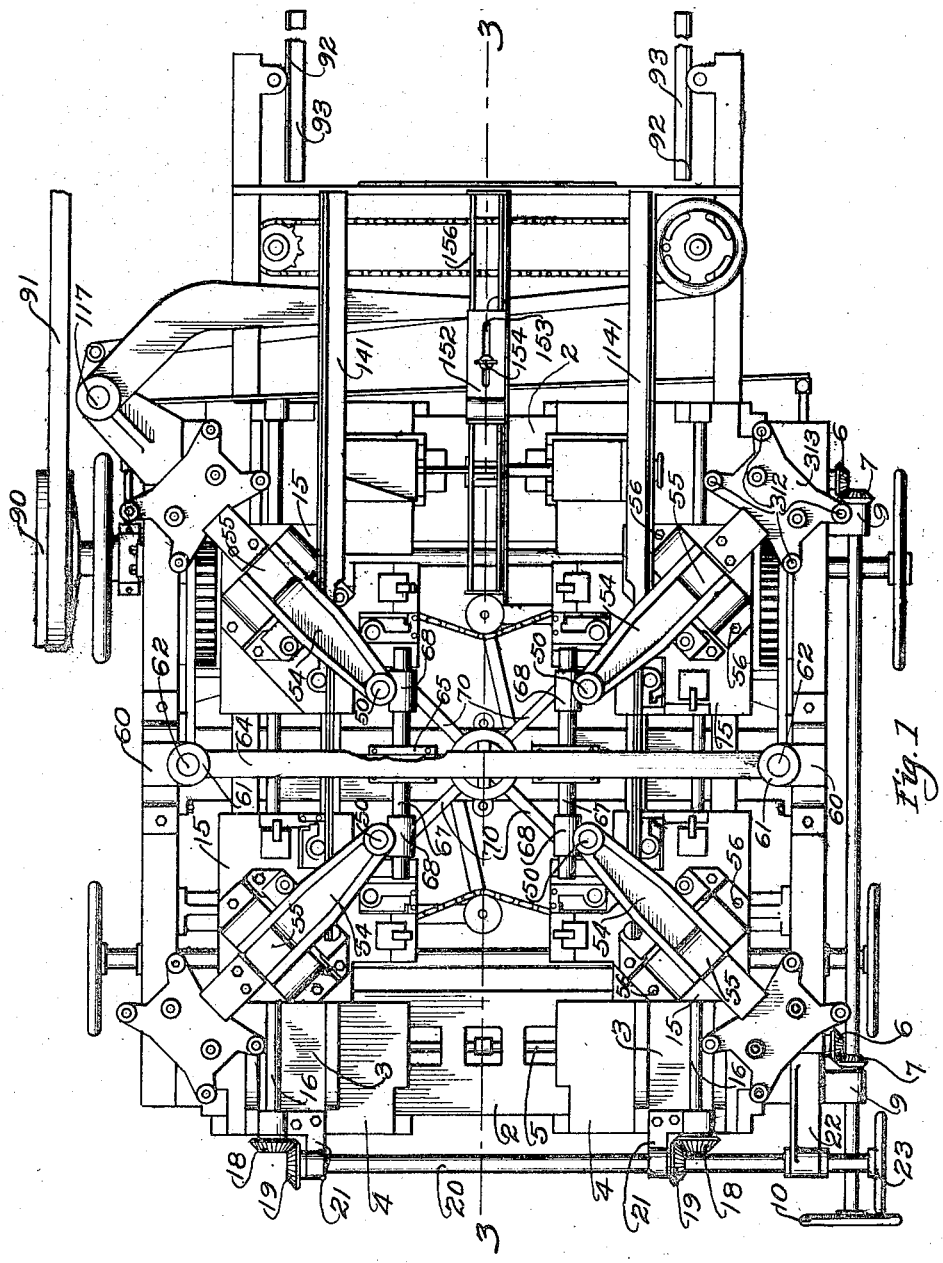
Fig. 1 is a top plan view of a machine embodying the present invention.

The machine containing the embodiment of the invention shown in the drawings consists generally of an open form onto which a blank of paperboard or other material is fed, and includes plungers for moving the board into the form to fold the sides of the blank into box formation, and duplicate stapling mechanisms, one located at each corner of the box for securing the folded corners, and mechanism for truing up the sides of the box and discharging it from the machine.

Figure 2:
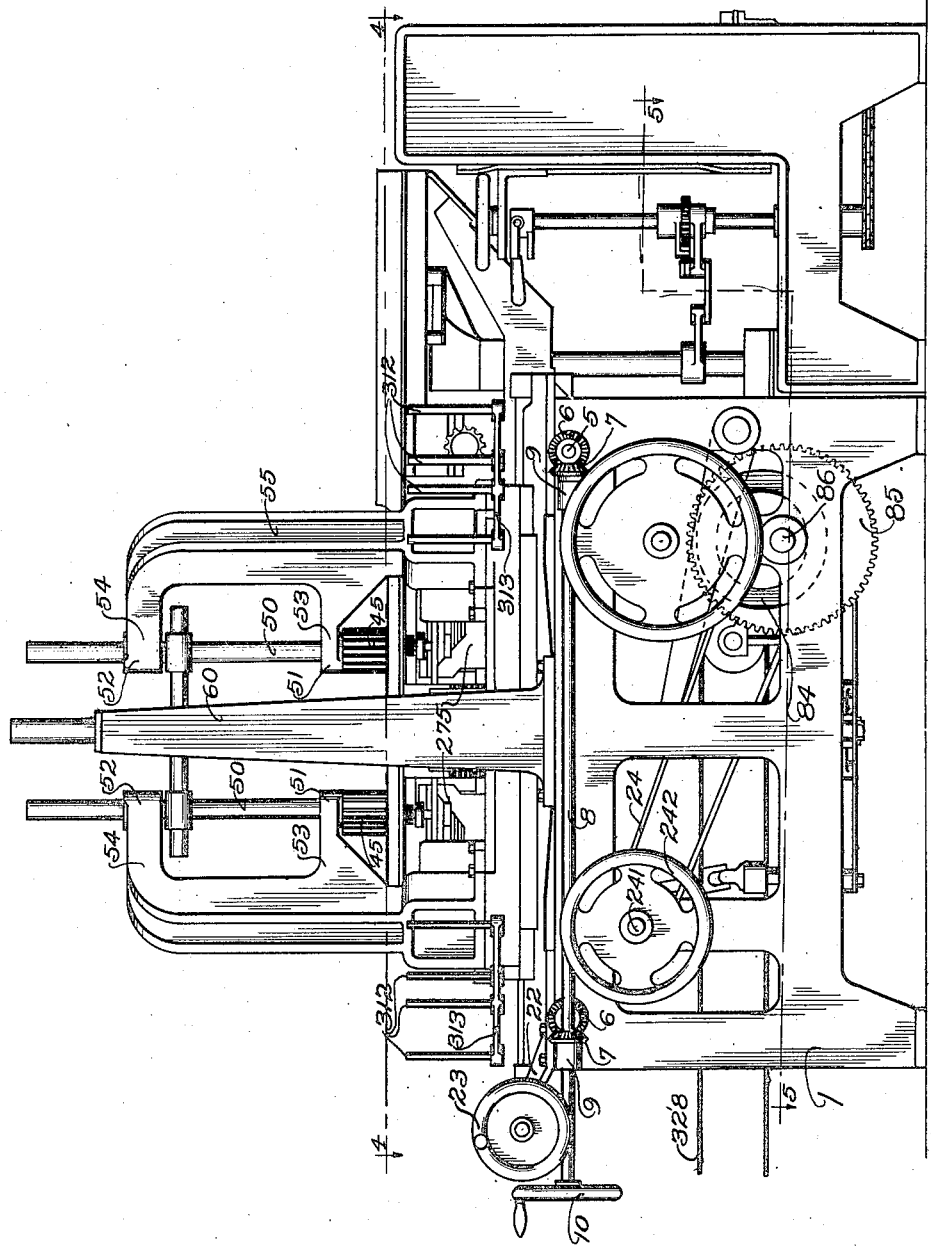
Fig. 2 is a side elevation of the machine shown in Fig. 1.
Figure 3:
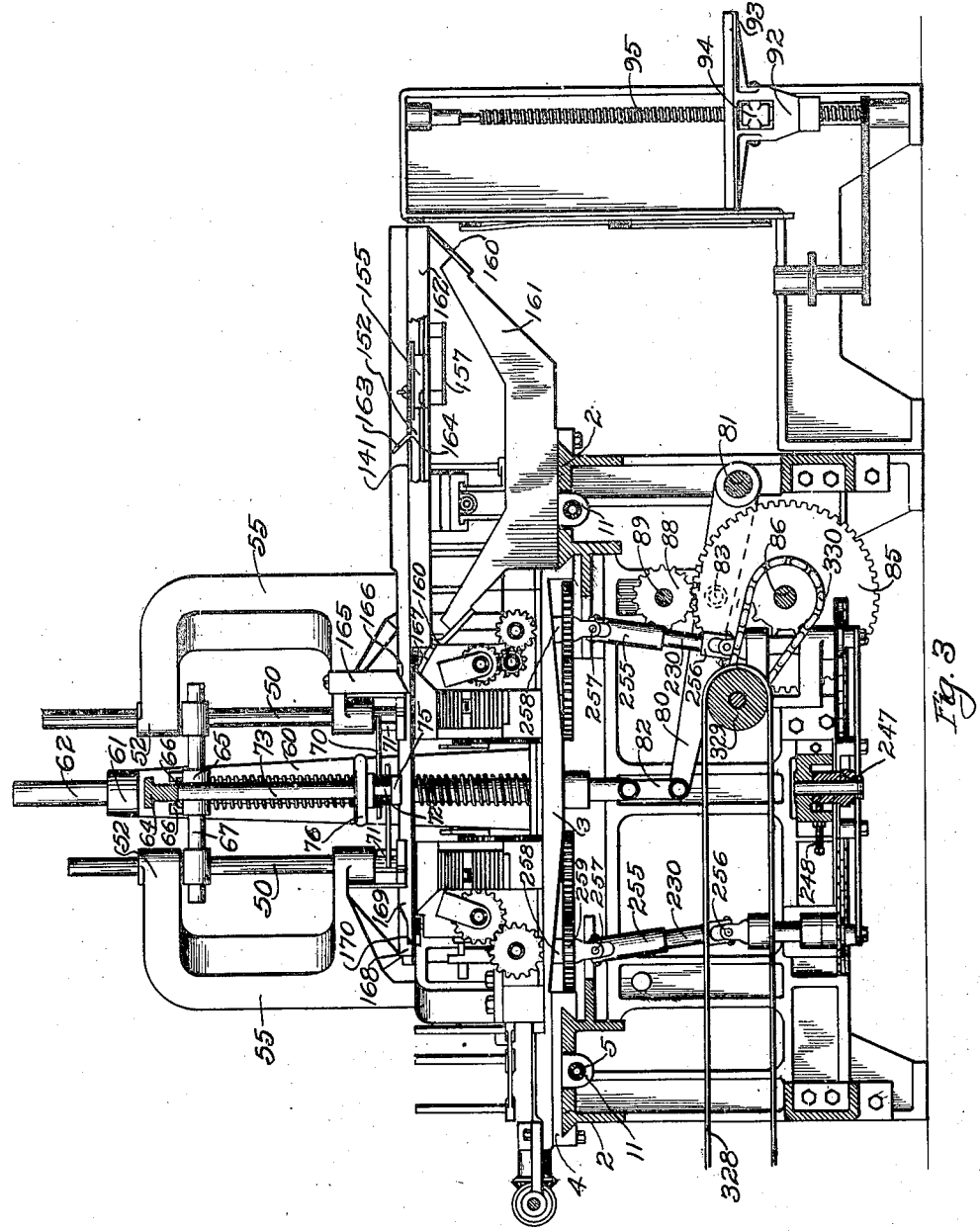
Fig. 3 is a central longitudinal sectional view on line 3—3 of Fig. 1.

In the drawings, the numeral 1 designates a framework of sufficient strength and rigidity for supporting the various operating parts of the machine and forming in a general way a table on which the operating parts are supported. The upper portion of this table comprises a pair of ways 2, one at each end of the table, as shown in Fig. 3, and extending transversely thereof. Mounted on these ways, one at each side of the table and arranged to move transversely of the table upon the ways, are two supporting beams 3, shown in Figs. 1, 3 and 8. The supporting beams 3 are provided at each end with a plate or block 4 which rests upon one of the ways 2, and is arranged to slide thereon to adjust the supporting beams 3 transversely of the table. Blocks 4 are moved along the ways 2 by a pair of shafts 5, one of which is located beneath each of the ways and which are driven by beveled gears 6, as shown in Fig. 2. The beveled gears 6 mesh with corresponding gears 7, carried on a shaft 8, journaled in bearings 9 attached to the side of the framework 1, as shown in Fig. 1. The shaft 8 is provided with a hand wheel 10 by means of which the gears 6 and 7 are rotated to drive the shafts 5. Each of the shafts 5 is provided with threaded engagement with downwardly projecting lugs 11 on each of the slide blocks 4, as shown in Fig. 3. Engagement with one of the blocks 4 is by means of a right hand thread, and engagement with the other is by means of a left hand thread, so that when the shaft 5 is rotated, the blocks are simultaneously moved either toward or away from one another, depending upon the direction of rotation of the hand wheel 10. Since the two shafts 5 are rotated by the common drive shaft 8, the blocks at opposite ends of the table are caused to move simultaneously so that rotation of the hand wheel 10 moves the entire supporting beams 3 transversely of the table, the beams being moved either toward or away from one another under control of the hand wheel 10.

Each of the beams 3 is provided with a pair of vertically disposed webs 14, the upper edges of which webs form a slideway for castings or blocks 15, there being a pair of castings 15 on each of the beams 3 and arranged to slide longitudinally thereon toward and away from one another. The blocks 15 are slid longitudinally along the beams 3 by shafts 16, there being a shaft 16 disposed within each of the beams 3 below the blocks 15 thereof, as shown in Figs. 1 and 8. Each of the shafts 16 is provided with right and left hand threaded engagement with the two blocks respectively carried on the beam 3 with which the shaft is associated, as shown at 17, in Fig. 8. Beveled pinions 18 are secured to one end of each of the shafts 16 and mesh with corresponding pinions 19 splined to a shaft 20 and free to slide along the shaft. The shaft 20 is journaled in bearing brackets 21 secured to the top of the blocks 4, which brackets are also provided with bearings for the shafts 16, as shown in Fig. 1. The shaft 20 is provided also with a bearing bracket 22 fixed to the upper surface of the slideway 2, as shown in Figs. 1 and 2. The shaft is provided with a hand wheel 23 by means of which it is rotated. It is apparent that by this construction the blocks 15 on each of the beams 3 may be moved toward or away from one another by rotation of the hand wheel 23. The adjustment of all of the blocks 15 is simultaneous, since they are all controlled by the same hand wheel. By combining the movements produced by the two hand wheels 10 and 23, the blocks 15 may be adjusted toward or away from one another as desired, but are always maintained in rectangular relations with one another.

Each of the blocks 15 is provided with the form for folding one corner of the box blank, by means of which the sides and ends of the blank are folded upwardly to form a box. Each block 15 also carries stapling mechanism for securing the folded sides of the box in place. The mechanism is substantially the same on each of the four blocks, and so a description of one of these units will be sufficient for all. Referring to Fig. 7, it will be seen that the block 15 has a right angular notch cut out of its inner corner, as shown at the upper left hand portion of the figure, and that adjacent the sides of this notch are upright plates 25, one of which is shown also in Fig. 8. Upright bars 26 extend upwardly from the casting 15 and form together with the plates 25, means for holding a series of spacer blocks 27, Fig. 10, in position. The blocks 27 are provided with notches 28 at the corners thereof, which receive ribs 29 extending vertically along the sides of the plates 25. The blocks 27 are also provided with notches 31 for receiving the upright bars 26. The blocks 27 are for the purpose of securing the stapling mechanism in adjusted positions so that the corners of the boxes when folded may be secured in a manner to be described. Secured to the upper edges of the upright plates 25, by means of machine screws 32, is a corner folder 33 for the box blanks, which is best shown in Figs. 17 to 21, inclusive. This folder is shown in position in Figs. 1, 3 and 8. One of the blanks from which the box is formed is shown in position on top of the four corner folders 33 at the beginning of a folding operation in Fig. 17 of the drawings. The blank 35 is slitted at each corner, as shown at 36, and is scored along lines 37 and 38 to facilitate folding along these lines. The flaps 39 fold upwardly to form the side walls of the box, while the flaps 40 are folded upwardly to form the end walls. The flaps 39 and 40 are of the same width, but in Fig. 17 of the drawings, flaps 39 are shown somewhat foreshortened, because of the fact that they are shown partially folded in this figure.

Figure 18:
Fig. 18 is an elevation of the parts shown in Fig. 17.
Figure 19:
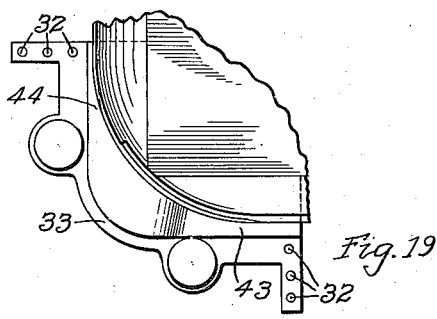
Fig. 19 is a plan view of one corner of the box folder showing a box corner partially folded.
Figure 20:
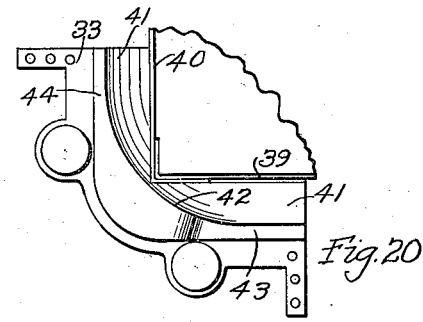
Fig. 20 is a view similar to Fig. 19 with a box corner completely folded.

The bottom portions of the inner walls of the corner folders 33 are arranged at right angles with one another, forming a square corner into which the corner of the box fits when completely folded, as shown in Fig. 20. The inner walls of the folders slope outwardly however from their bottom edges at the ends of the two angular legs of the folders, as shown at 41, in Figs. 8 and 20. The folding surface 41 is rounded off however so that the wall is substantially vertical at the apex of the angle formed by the meeting of the two legs thereof. This is indicated by the line 42, Fig. 20, which represents the upper edge of the sloping wall 41. In order that the side flaps 39 may be folded inside of the end flaps 40, their inward movement must begin before that of the flaps 40, and to secure this preliminary movement, the portion 43 of the upper surface of the corner folders 33, which contacts with the side walls 39, is made somewhat higher than the corresponding portion 44, which contacts with the end walls 40, as is shown in Figs. 18 and 20. Plungers 45 operated by mechanism to be described are provided for forcing the blanks 35 downwardly through the form made up by the folders 33. These plungers 45 are provided with right angular surfaces which are spaced inwardly from the inner surfaces of the folders 33 a sufficient distance to allow for the thickness of the sides of the box between the plungers and the folders. In operation, the lower surfaces of these plungers are brought to bear on the portion of the box blank which forms the box bottom adjacent the folders and move downwardly in unison to carry the blank downwardly through the space between the folders. As the blank moves downwardly, the ends of the side flaps 39 are first folded inwardly because of the raised portions 43 of the folders, and these ends are followed closely by the ends of the flaps 40, the ends of the two flaps sliding closely on one another in a curved formation, as shown in Fig. 19. During this part of the folding operation, the middle portions of the flaps remain much lower than the end portions due to the resistance of the flaps to bending, and due also to the fact that the folders are beveled at 41 as previously explained, thus causing the folding action to proceed much more rapidly at the corner of the box than it does toward the central portions of the sides. This produces a curved contour in the sides being folded so that the end of the inner flap will slide on the inner surface of the outer flap, permitting the two flaps to be folded together simultaneously and at one operation. If it were attempted to fold the entire length of the flaps inwardly at the same rate of speed, it is at once apparent that the end of the inner flap would butt squarely against the inner surface of the outer flap and a crumpling instead of a folding operation would result. This curved formation of the flaps during the folding is all the more important in view of the fact that the side flaps are scored along lines 46 upon which the ends of the flaps are folded when they are brought into permanent position. It is clear that the inner end of the side 39 must slide past the score line 46 on the end flap 40. As the plungers continue to move the blank downwardly through the folders, the sides 39 and 40 are brought into their upright position by the lower edges of the inner walls 41 of the folders, thus squaring the corners of the box and bringing the score lines 46 into registration with one another, as shown in Fig. 20. In this way all four sides of the box are brought into position simultaneously, and when thus folded they are secured in this position by wire staples driven by mechanism to be described. It is apparent that the folders 33 can be adjusted relative to one another by means of the adjusting wheels 10 and 23 and the associated mechanism previously described, so that rectangular boxes of varying sizes and shapes may be formed.

The plungers 45 by means of which the blanks are forced through the folders are carried at the lower ends of upright rods 50, which slide in bearings 51 and 52, Fig. 1. The bearings 51 and 52 are located at the ends of inwardly projecting arms 53 and 54 respectively, which are supported by upright standards 55 fastened to the upper surface of the blocks 15 by lag screws 56, as shown also in Figs. 1, 7 and 8. Since the standards 55 are rigidly secured to the castings 15, which also carry the corner folders 33, it is apparent that the plungers 45 will also bear a fixed relation to the corner folders regardless of the position of adjustment of the folders for different sized boxes.

The mechanism for reciprocating the plungers 45 is illustrated in Figs. 1, 2 and 3. Extending upwardly from each side of the frame member 1, midway between the ends of the ways 2, are two standards or pedestals 60, having bearings 61 at their upper ends in which slide a pair of vertical rods or shafts 62. At the lower ends, the rods 62 slide through openings in lugs 63, Fig. 4, secured to the pedestal 60. An I-beam 64 connects the rods 62 below the upper bearings 61, and is rigidly secured at its opposite ends to the rods. A pair of slides 65 are mounted to move back and forth along the I-beam 64, the slides having overlying flanges 66, Fig. 3, which bear upon the upper surfaces of the lower flange of the I-beam 64. Each of the slides 65 carries a cross-rod 67 rigidly secured thereto, and these cross-rods 67 have their ends arranged to slide in collars 68, which collars are rigidly carried by the plunger rods 50. When the standards 55 and associated parts are moved along the beams 3 to adjust the standards longitudinally of the machine, the collars 68 slide toward or away from one another along the cross-rods 67. When the standards 55 are adjusted transversely of the machine by sliding movement of the beams 3 upon the ways 2, the rods 67 move with the standards toward or away from one another, this movement being permitted by the slides 65 sliding on the I-beam 64. By this arrangement, the plunger rods 50 are held in fixed relation with the bars 62 as regards vertical movement, but are free to move relative to one another in horizontal directions. The plunger rods 50 may be locked in their horizontally adjusted positions by means of a series of bars 70. The bars 70 are pivotally secured at their outer ends to upstanding lugs 71, Fig. 3, carried on the inner portions of the plungers 45. The inner ends of the bars 70 are slotted, and these slotted ends are carried for sliding movement on a pin 72, secured at the lower end to a rod 73 which is rigid with and projects downwardly from the middle of the I-beam 64. A head 75 secured to the lower end of the pin 72 holds the bars 70 in place on the pin. A hand wheel 76 is threaded on the lower end of the rod 73, and by means of this hand wheel the slotted ends of the bars 70 may be rigidly clamped between the hand wheel and the head 75 to hold the pin 72, together with the associated plungers 45 and plunger rods 50, in whatever adjusted position it may be placed. The bars 62, the I-beam 64, the plungers 45, and the connecting parts have a vertical reciprocatory movement imparted thereto by means of arms 80. The arms 80 are pivoted to oscillate vertically upon the shaft 81 as an axis and have their opposite ends connected with the bars 62 by means of links 82 so that oscillatory movement of the arms is transmitted to the bars 62 and the connected mechanism. The arms 80 are oscillated by cam rollers 83, which operate in cam grooves 84, formed in the outer lateral faces of gear wheels 85, which are rigidly mounted on a shaft 86, as shown in Figs. 2, 3 and 5. The gear wheels 85 mesh with pinions 88, secured to a main drive shaft 89, which is driven by a pulley 90 and belt 91, or by any other suitable power device.

Figure 4:
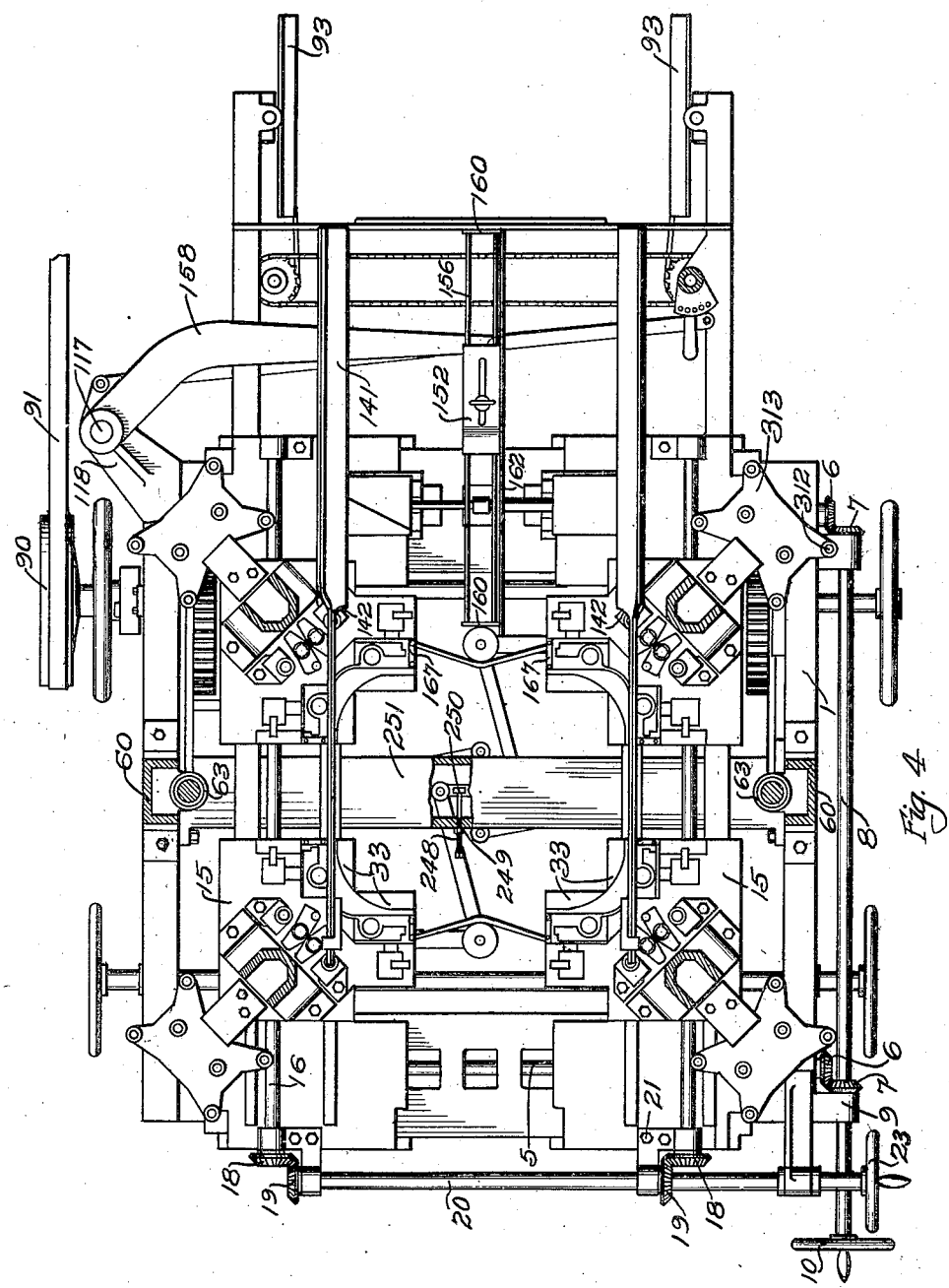
Fig. 4 is a horizontal sectional view substantially on line 4—4 of Fig. 2.
Figure 17:
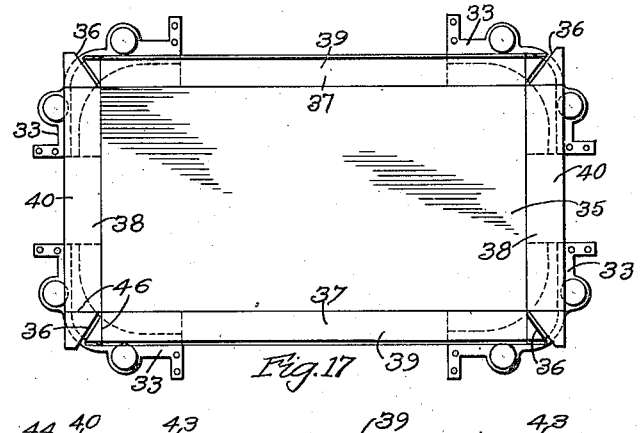
Fig. 17 is a diagrammatic view showing in plan a blank ready to be formed into a box.

The blanks from which the boxes are formed are brought to the machine on boards or trays resting on low trucks, and these trucks when moved to a position between blank brackets 92, Figs. 1, 3 and 4, bring the ends of the trays or boards on which the blanks rest to a position just above projecting ledges 93 on the brackets 92. The brackets 92 are pivotally supported on slide blocks 94, which surround upright screw-threaded standards 95. The sides of the blocks 94 are bored to fit the outer circumference of the screw threads on the standards 95 and slide freely over the threads. The brackets 92 with their superimposed load of blanks are fed upwardly during the operation of the machine by a rotation of the screws 95, which rotation is produced by mechanism best shown in Figs. 1, 2, 3, 4 and 5, and fully described in the co-pending application named above but forming no part of the present invention.

At each operation of the machine a blank is taken by the operator from the top of the stack carried on the brackets 92 and placed upon guides 141, shown in Figs. 1, 3 and 4. The guides 141 are in the form of angle bars, and extend inwardly into a position above and just outside of the corner folders 33. These guides have their horizontal web cut away, as shown at 142, Fig. 4, to permit the blanks to be easily moved downwardly by the plungers 45.

The blanks are placed upon the guides 141 in advance of a sliding follower 152, which is shown at about its midposition in Figs. 1, 3 and 4. The follower 152 is adjustably connected by means of a slot 153, a thumb nut 154 with a carriage 155 mounted to slide on guide rods 156 secured to the frame of the machine. The carriage 155 is pivotally connected by means of a link 157 with the end of an oscillating arm 158. The arm 158 is rigidly secured to the upright shaft 117 which is oscillated once for each rotation of the shaft 86. The guide rods 156 are secured at their ends to plates 160 secured to the opposite ends of an irregular shaped plate 161 fastened to the slideway 2 near the center thereof. The plates 160 also carry a bar 162, the upper edge of which is in the same horizontal plane as the upper surface of the guides 141. The bar 162 supports the central portions of the blanks as they are being fed to the machine. At each operation of the machine, the attendant places a blank in front of the follower 152 which is provided, as shown in Fig. 3, with an upwardly inclined engaging plate 163 having an off-set notch 164, at the bottom portion thereof for engagement with the edge of the blank. As the blank is moved forwardly it is directed into position by guides 165, Fig. 3, having beveled edges 166 for directing the forward edge of the blank downwardly. To prevent the forward edge from drooping downwardly, upwardly sloping guiding blocks 167 are attached to the corner folders 33, as shown in Figs. 3 and 4, and direct the edges upwardly into the proper horizontal plane. The forward movement of the blanks is limited by stops 168, one of which is secured to each of the guides 141. These stops, as shown in Fig. 3, are provided with inclined surfaces 169 which catch the forward edge of the blank and direct it against the abutment surface 170 by which the forward movement is limited.

The stitching or stapling of the box corners to hold them in the position in which they are folded by the corner folders 33 and the plungers 45, takes place at the time that the plungers are in their extreme lower position and is accomplished by a series of stapling heads held in place by the spacer blocks 27. As shown in Fig. 7, there are two sets of these blocks at each corner of the machine, each set consisting of a stack of blocks piled upon one another, as shown more clearly in Fig. 8. The blocks as previously stated are held in place by upright plates 25 and upright bars 26 rigid with the slide blocks 15, and the inner face of each stack of blocks is in vertical alinement with the inner face of the corresponding corner folder 33. It will thus be seen that when the box blank has been forced through the corner folders, the overlapping corner portions of the side flaps will lie adjacent the vertical edges of the blocks 27 and between these edges and the sides of the plungers 45. The stapling heads, as shown in Fig. 8, are interpolated between the blocks 27 and may be spaced at any vertical position desired by shifting the number of blocks that is above and below the stapling head. The operating ends of the stapling heads are caused to aline with the inner vertical edges of the spacers so that a staple forced outwardly from the stapling head pierces the overlapping flaps of the box corners, and the ends of the legs are then bent over by contact with the face of one of the plungers 45. The construction of the stapling head will best be understood by reference to Figs. 23 to 31 inclusive. The stapling head consists of a casing block 175 slotted on its lower side to receive a plunger 176. A bottom cover plate 177 is secured to the lower side of the casing block by machine screws 178. A slot 179 is cut through the upper central portion of the casing block extending from the slot for the plunger 176 upwardly entirely through the casing block. A staple shifting lever 180 is pivoted on a pin 181 to oscillate in the slot 179. The slot 179 does not extend entirely to the front end of the casing block 175, but a sufficient amount of the block is left at that end to form a cross-bar 182 to which a wire guide and anvil block 183 is secured by means of a screw 184. This block is provided with a downwardly extending lug 185. The forward edge of this lug 185 forms with the rear surface of the anvil 183 a passageway through which the wire 186 passes, as shown in Figs. 23 and 24. The lower cover plate 177 is provided at its front edge with a pair of upwardly projecting lugs 188 which lie adjacent the inner walls of the plunger groove at the forward end of the stapling head, as shown in Figs. 23 and 25. The shape of the plunger 176 is best shown in Fig. 31 in which it will be seen that the forward end of the plunger is provided with a tongue 189 by means of which the staples are driven into the box corners, and above and on each side of this plunger is a shearing bar and former 190. The upper surface of the plunger is provided with a pair of cam grooves 191 and 192 for operating the staple shifting lever 180. This lever is bifurcated at its forward end, as shown best in Fig. 27, and each bifurcation carries a downwardly projecting finger 193 for contacting with the staples after they have been formed to shift their position in a manner to be described. The lever 180 has projections 194 and 195 at its front and rear ends respectively for contacting with the cam grooves 191 and 192. The staple wire is fed to the stapling head through a wire guide 196 which fits in an opening in the side of the casing block 175 opposite the rear face of the handle portion of the block 183. The opening for the guide 196 extends downwardly a sufficient amount so that it cuts through the lower surface of the frame casing 175, as shown at 197, in Fig. 23. The guide is cut away, as indicated at 198, Fig. 28, so that one of the flat sides 198 will lie in the plane of the lower surface of the casing frame 175 when the wire guide is in place and in position to bring the opening 199 therein into vertical position. The wire guide 196 is held in place by a screw-threaded plug 200 which fits into a threaded opening in the casing frame 175 in the rear of the guide 196. The opening for the plug 200 is formed while the cover plate 177 is in place so that the opening extends partially into the upper surface of the cover plate. This cover plate is provided with a centering pin 201, which pin, together with the projecting lugs 188 insures accurate positioning of the plate relative to the casing frame 175. The screw-threaded plug 200 is centrally bored at 202 to receive the wire 186, the outer end of the bore being beveled, as shown at 203, to guide the wire into place. The opening 202 of the screw-threaded plug extends into the wire guide and is tapered inwardly, as shown at 204, to properly direct the wire into the slot 199. In order that the stapling head may be easily transformed from a right hand to a left hand head, a second opening is provided in the casing block 175 opposite the wire guide 196, and is normally closed by an abutment plug 205. The end of this plug forms an abutment which limits the inward movement of the wire into the stapling head, and the head may be easily changed from a right hand to a left hand device by shifting positions of the plugs 196 and 205. The plug 205, as shown in Fig. 30, is integral with the screw-threaded portion instead of being formed in two parts as is the plug 196 and its threaded holder 200.

During a stapling operation the wire is fed through the slot 199 by mechanism to be described, the wire reaching approximately the position shown in Fig. 23 at the time the plunger 176 begins is forward stroke. As the plunger continues to move forwardly, the wire is fed farther into the stapling head so that by the time the shearing and staple forming bars 190 reach the wire, it will extend across the slot formed in the casing block 175 for the plunger. As will be seen from Fig. 24, the driving tongue 189 during this forward stroke will pass below the wire 186 so that the wire is first contacted by the forward ends of the shearing and forming bars 190. Either at the time, or just before the bars 190 reach the wire, the forward movement of the wire ceases and the feeding thereof is discontinued until a later period in the cycle of operation. As the plunger continues to move forwardly the wire is severed by one of the bars 190, and the two ends of the severed portion are bent about the rear or anvil face of the block 183, thus forming the two legs of the staple. During this bending movement, the central portion of the cross-bar of the staple is prevented from bulging backwardly by its contact with the downwardly extending projection 185. The cut away portion of the cam slot 191 provides clearance for this projection, as will be seen in Fig. 26, thus permitting the shoulders 206 on either side of the cam slot to abut against the cross-bar of the staple, as shown in Fig. 26, to insure a true formation of the staple. After the staple has thus been formed, the plunger is retracted and the staple is moved downwardly by the fingers 193 on the staple shifting lever 180 into position in front of the tongue 189 of the plunger and between the upwardly extending projections 188 on the bottom cover plate 177. The shifting of the staple is accomplished by the contact member 195 riding upwardly on the forward end of the cam slot 192, thus forcing the fingers downwardly into contact with the upper edges of the legs of the staple.

This action takes place at the extreme portion of the rearward movement of the plunger, as will be evident from an inspection of Fig. 24. When the plunger again moves forwardly, the staple that has been formed during the previous forward stroke will lie between the projections 188 and directly in the path of movement of the tongue 189 of the plunger. As the tongue 189 moves forwardly it will, of course, force the staple before it and press the legs of the staple through the overlapping corner portions of the box flaps 39 and 40, as shown in Fig. 26. As the legs of the staple push through the corner flaps they contact with the outer face of the plunger 45 and are thus bent over or clinched in position. The surface of the plunger is provided with corrugations or grooves 210 for this purpose. During the driving operation of the staple by the tongue 189, a second staple is being formed by the bars 190, which second staple is moved into position in front of the tongue 189 at the end of the next return stroke of the plunger. The fingers 193 are moved out of the way of the staple forming bars 190 during the forward stroke of the plunger by the weight of the rear end of the lever 180 which moves the contact member 195 into the cam groove 192, positive movement being assured by contact between the member 194 and the rear end of the cam groove 191. It will thus be seen that at each stroke of the plunger one staple is driven into the box, and a second staple if formed and moved into position to be driven by the next succeeding stroke.

A special plate 215, Fig. 12, is provided for holding the stapling head just described, and which is designated generally by the numeral 216. The plate 215 is provided with an opening 218 to receive the upright bars 26 in the same way that they are received, by the openings 31 in the spacer blocks 27. Similarly the plate 215 is provided with corner notches 219 to fit the projections 29 on the upwardly extending plate 25. By this arrangement the plate 215 may be held at any position in the stack of spacer blocks 27 in which it may be found desirable to place it for properly locating the staples in the overlapping flaps of the box corners. The stapling head 216 is provided with downwardly extending pins 220 which register with openings 221 in the upper surface of the plate 215. A number of these openings is provided to permit adjustment of the stapling head laterally relative to the plate. Upwardly extending projections 222 are formed in the upper surface of the plate 215, the upper surface of which projections lie in the same plane as the upper surface of the stapling head 216 so that the spacer block which is placed next adjacent the plate 215 will bear equally on the projections 222 and the upper surface of the stapling head. When a stack of blocks is formed up with the special plates 215 and their stapling heads in position, the entire stack is held in place by thumb screws 225, Fig. 8, threaded into the corner folders 33 and arranged to bear against the upper surface of the uppermost plate 27. The plate 215 carries also a rearwardly extending portion 226 upon which a portion of the wire feeding mechanism is mounted, as will be later explained.

The reciprocating bars or plungers 176 of the stapling heads are operated from a series of upright shafts 230, Figs. 3 and 5, there being one of these shafts for each of the four corners of the machine. One of the shafts 230, as shown at the lower right hand corner of Fig. 5, is provided with a spiral gear 231, which meshes with a corresponding gear 232 mounted on the shaft 86, but is free to rotate thereon. The gear 232 is provided with an extending sleeve or hub 233, having a collar 234 rigidly secured to the end thereof by means of a set screw 235. A second collar 236 is rigidly secured to the shaft 86 with one of its lateral faces adjacent the lateral face of the collar 234. A spring pawl 237 is carried by the collar 236 and co-operates with ratchet teeth 238 in the collar 234. By this arrangement a oneway drive is provided for transmitting power from the shaft 86 to the gear 232, and hence to the shaft 230. The collar 234 is provided with a sprocket wheel 239 on which a sprocket chain 240 operates. The sprocket chain 240 extends over a corresponding sprocket wheel on a shaft 241, Fig. 2, to which a hand wheel 242 is attached. Rotation of the hand wheel 242 will drive the gears 231 and 232 and the shaft 230 without rotating the shaft 86 because of the ratchet connection between the collars 234 and 236. This permits operation of the stapling mechanism through the connecting gearing, to be described, without rotating the shaft 86, and consequently without operating the plungers 45. The shafts 230 are provided at their lower ends with sprocket wheels 243 over which a sprocket chain 244 is trained for the purpose of causing all of the shafts 230 to operate in unison. A series of rollers 245 attached to links 246 and the arms of a support 247 constitutes a tightener for the sprocket chain 244. The support 247 is held in adjusted position by a threaded rod 248, Figs. 3 and 4, provided with a lock nut 249. The end of the rod 248 is secured to a lug 250 which is swiveled in a slot in one arm of the support 247. The rod 248 has threaded engagement with a cross-beam 251 of the machine frame.

Figure 22:
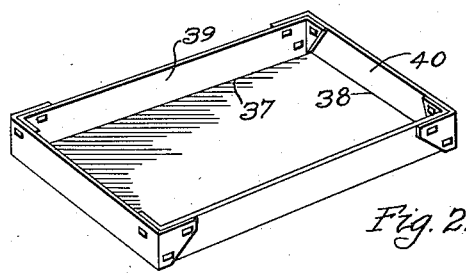
Fig. 22 is a perspective view of a completely formed box.

As shown in Fig. 3, the shafts 230 are connected by means of telescoping extensions 255 and universal joints 256 and 257 with upright shafts 258, journaled one in each of the sliding blocks 15. Carried by each shaft 258, below the supporting beam 3, is a spur gear 259, Figs. 3, 6 and 9. As shown in Fig. 6, these shafts also carry directly above the spur gear 259 one member 260 of a Geneva drive. The other member 261 of the Geneva drive, see also Fig. 16, is secured to a shaft 262 journaled for rotation in the block 15. The shaft 262 drives the wire-feeding mechanism, as will be described. The spur gear 259 in each of the blocks 15 meshes with a pair of spur gears 265, each of which is secured to a shaft 266 journaled in the block 15. The shafts 266 are provided with beveled gears 267 rigidly secured to their upper ends and located in recesses 268 in the upper surface of the block. Each of the gears 267 has a crank pin 269 let into the upper surface thereof. A short pitman rod 270 connects the pin 269 with a corresponding pin 271, secured to a reciprocating slide 272, Figs. 8 and 9. The slide 272 reciprocates in a channel 273 formed in the upper surface of the block 15, and there are two such channels and reciprocating slides in each of these blocks. As will be understood from Fig. 9, these channels and slides are positioned at right angles with one another so that the slides may operate the two sets of stapling heads arranged for inserting the fasteners into the adjacent sides of the box which meet at right angles to form a box corner. The forward portions of the slides 272 are provided with projecting lugs 274 upon which the box which is being formed rests when the plungers 45 reach their extreme lower position. Each slide 272 carries on its upper surface an upwardly projecting plate 275 by means of which connection is made between the reciprocating slide and the corresponding plunger 176, by means of which the particular stapling head connected with this slide is operated. As shown in Figs. 2, 7 and 16, each plate 275 is provided with inclined edges 276 which cooperate with a notch 277 in a block 278 secured to a plunger 176. The block 278, as shown in Fig. 12, is provided with a recess 279 into which the plunger 176 extends and in which it is held by a set screw 280. The depth to which the plunger extends into the recess is regulated by an adjusting screw 281 provided with a lock nut 282. In setting the block on the plunger, the adjusting screw 281 is first set, and the block is afterward permanently secured in place by means of the set screw 280 with the end of the plunger in contact with the end of the adjusting screw. As previously stated, the position of a stapling head may be adjusted vertically by shifting it relatively to the spacer blocks 27. At the same time that it is adjusted vertically, it is also adjusted horizontally, the line of movement of the stapling head corresponding to the angle of the inclined face 276 of the plate 275. The openings 221 in the special block 215 which carries the stapling head are so spaced that there is a set of these openings for the positioning pins 220 for each vertical position of the stapling head, the openings being properly located to bring the notch 277 of the block 278 in proper relation with the inclined surface 276. It will be understood that this arrangement brings the stapling head nearer the corner of the box as it is moved downwardly or toward the box bottom. An inspection of Fig. 22 of the drawings will show that this is the correct arrangement, since the staples positioned near the box bottom are also located close to the corners of the box, and the staples located farther up on the sides of the box are also spaced a greater distance from the corners. It will also be seen from this figure that two staples are used for the flaps at one side of the box. In order that these two staples may be driven at one operation, a pair of stapling heads instead of a single one is placed in one of the stacks of spacers 27 at each corner of the box, while a single stapling head is placed in the other stack, as shown in Fig. 8. It will now be understood that for each rotation of the shaft 266, the plungers of each of the stapling heads are reciprocated to drive a staple into the box corner. The parts are so timed that the plungers reach their extreme forward position at the same time that the projections 274 are extended beyond the surfaces of the spacer blocks 27, and also at the same time that the plungers 45 reach their lowermost position. The extent of the forward movement of the driving plungers 176 may be regulated by means of the adjusting screws 281 in the manner previously described.

It will be understood from an inspection of Fig. 6 that during the greater part of the rotation of the shaft 258, the shaft 262 will remain stationary, but that at a certain point in the rotation the pin 290 carried by the gear member 260 with mesh with an opening 291 in the gear member 261 and impart a partial rotation to the shaft 262. The shaft 262, as shown in Fig. 16, has a pinion 292 secured thereto at the upper surface of the block 15. This pinion meshes with a corresponding pinion 293 on a complementary shaft 294 journaled in the block 15. The pinions 292 and 293 each mesh with a pinion 295 carried on stud shafts 296 journaled in openings in the upper surface of the block 15, and each carrying wire feed rollers 297 rigidly secured thereto. Casings 298 partially surround the rollers 297 and provide bearings for the upper ends of the shafts 296, these casings being secured to the upper surface of the block 15. The shafts 262 and 294 extend respectively into openings in the projecting portions 226 of the special spacing plates 215 which carry the two sets of stapling heads 216. Each extension 226 has a plate 300 pivoted thereon for movement about an axis 301, the plate being spaced upwardly from the projection by a spaced portion 302 secured to the upper surface of the projection. A roller 303 is interposed between the plate 300 and the projection 226 and is provided with an upwardly extending shoulder 304 which is journaled in an opening 305 in the plate 300, Figs. 12, 14 and 15. The interior of the roller 303 is provided with a series of grooves or keyways 307 which fit over projections or ribs 308 extending longitudinally of the upper portions of the shaft 262 or 294, as the case may be. The ribs 308 are smaller than their corresponding openings 307, and the bore of the roller 303 is also greater than the shaft which passes therethrough. This permits slight lateral movement of the roller relative to the shaft without disturbing the driving connection between the roller and the shaft. Each plate 300 is provided with a spiral spring 309 which tends to draw the plate and the roller journaled therein toward the corresponding feed roller 297. A block 310 is secured to the upper surface of the projection 226 by a machine screw 311, and is provided with a guide slot through which the wire 186 is directed between the periphery of the roller 303 and the periphery of the roller 297. The wire after passing between the rollers is guided along the vertical edge of the spacer block 302 and through an opening in the block 222, and thence to the wire guide 196 in the stapling head. It will be seen that the spring 309 produces a resilient pressure between the two feed rolls so that at each partial rotation of the shaft 262 caused by the Geneva drive, the wire will be fed forwardly, the amount of feed corresponding to the length of wire necessary to form the staple. The timing of the feeding operation is so arranged that the wire is fed into the stapling head at the proper time to be acted upon by the reciprocating plunger 176, as previously explained. The wire is supplied from a series of spools carried by spindles 312 projecting upwardly from plates 313 secured to brackets 314 fastened to the outer corners of the blocks 15, as shown in Figs. 1, 2 and 4.

Figure 21:
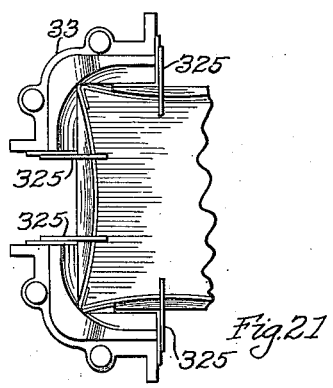
Fig. 21 shows two corner folders of the box former as the box is being discharged therefrom.

After the corners of a box have been secured by the wire staples, driven in the manner described, the plungers 45 are withdrawn from within the box, and the box is discharged downwardly from the machine. In order to strip the box from the plungers as they move upwardly, the spacer block 27 located immediately above the uppermost stapling head is provided with a spring-pressed stripper plug 315, Figs. 8, 10 and 11. The stripper plugs are inserted in holes 316 drilled in the edge of the spacer blocks, and the plugs are held in place by pins 317 passing through a notch 318 cut in the side of the plug. A spiral spring 319 normally forces the plug outwardly so that it projects slightly from the edge of the block 27. The upper surface of the end of the plug is beveled at 320 so that the stripper will offer no resistance to the downward movement of the box, but the lower surface of the ends of the plug is provided with a shoulder 321, which engages the edge of the upturned sides of the box after the corners have been fastened and thus strips the box from the plungers during the upward movement of the latter. After the plungers have been drawn upwardly, the box is forced downwardly by arms 325, Figs. 3, 7, 8 and 21. The arms 325, as shown in Fig. 9, are operated by shafts having journal bearings carried in the block 15 and having beveled pinions 326 which mesh with the beveled pinions 267 driven by the shafts 266. Each arm 325 is provided with a set of gears 327, the number of gears in each set varying somewhat, but the arrangement being such that each arm 325 is rotated inwardly and downwardly against the upper edges of the upturned sides of the box, as shown in Figs. 3 and 21. This movement not only forces the box downwardly from between the upright surfaces formed by the spacer blocks 27, but also bends the sides of the box inwardly somewhat, as shown in Fig. 21, thus overcoming the tendency of the sides to spring outwardly and giving them a permanent set in a plane substantially at right angles to the bottom of the box. As the box is thus forced downwardly it falls upon the upper surface of a conveyer belt 328, Fig. 3, passing over a roller 329 journaled in bearings carried by the frame 1 of the machine, and located beneath the central portion of the machine, and spaced inwardly from the lateral sides thereof. The roller 329 is driven by a sprocket chain 330 from the shaft 86. The outer end of the conveyer belt may be supported by an idler roller at any position desirable so that the boxes as they are formed are transported from the machine and discharged at a convenient position.

The operations of the various parts of the machine have been described in connection with the description of the construction thereof and it will, therefore, be unnecessary to again describe in detail the functions of the various parts. A general review of the operations as a whole will, however, be given. The blanks to be formed into boxes are placed upon a loose shelf or tray and resting upon a truck, or moved into position above the brackets 93 and the brackets raised until the tray holding the blanks rest upon the brackets. The machine is set by means of the hand wheels 10 and 23 so that the opening between the inner portions of the angular-shaped corner folders 33 corresponds in size and shape to the outer contour of the box to be formed as determined by the score lines 37 and 38 on the blank. The guides 141 are adjusted to bring the vertical portions of these guides into proper spaced relation to permit the insertion of the blanks between these portions of the guides. The stapling heads are properly arranged between the spacer blocks 27 to locate the staples in the desired positions in the overlapped portions of the sides of the box, and the wire from which the staples are to be formed is placed upon the spindles 312 and threaded into the wire-feeding mechanism. When power is supplied to the machine, the lever 158 will reciprocate the follower 152, and at each reciprocation of this follower, the attendant places a blank upon the guides 141 in front of the follower. The blank is moved forwardly along the guides 141 until checked by the stops 168. When this occurs, the plungers 45 move downwardly forcing the blank past the corner folders 33, which folders bend the side flaps of the blank upwardly, one flap at each corner moving a little in advance of the other so that the two flaps are easily overlapped and slide upon one another by a continuous movement until the folded portions are brought into vertical position at the corners of the box. When the plungers 45 have reached the lower portion of their movement, the slides 272 are in their forward position so that the projections 274 form a support for the folded blank. At the same time the staple driving plungers 176 are advanced and force the staples which have been formed during the previous cycle through the overlapping corners of the box, thus forcing the ends of the staples against the vertical sides of the plungers 45. As the plungers 45 are withdrawn, the box is stripped therefrom by the stripper plugs 315 and is afterward forced downwardly by the rotating arms 325, which at the same time bend the sides inwardly to give them a permanent set at right angles to the bottom of the box. The complete box falls upon the conveyer 328 and is discharged from the machine.

I claim:

1. In a box making machine, a self-contained head for inserting fasteners in portions of a box to be secured, and means for holding said head in adjusted positions to accommodate said machine to different sizes and shapes of boxes, said head being bodily removable from said machine and insertable in a different position in said machine and in a different relation to said holding means.

2. In a box making machine, a head for inserting fasteners through portions of the box to be secured, and a plurality of interchangeable spacers arranged to hold said head therebetween in various adjusted positions.

3. In combination, a head for inserting fasteners into materials to be secured together, and interchangeable spacers for holding said head in place, said head being insertable between different pairs of spacers.

4. In combination, a horizontally arranged head for driving fasteners into materials to be secured together, a plurality of superposed spacers for holding said head in place, the vertical adjustment of said head being capable of change by interchanging the position of said head relative to said spacers.

5. In combination, a head for inserting fasteners into the materials to be secured, a plurality of interchangeable spacers for holding said head in adjustable positions, said head being adjustable in the direction of the planes of said spacers and also adjustable by interchanging the positions of said head and spacers.

6. In combination, a pair of heads for inserting fasteners in material to be secured, and a plurality of spacer blocks for holding said heads in position.

7. In a box making machine, a head for inserting fasteners in material to be secured, a plurality of spacer blocks for holding said head in adjusted positions, and an operating device for said head arranged to cooperate therewith in said various positions.

8. In combination, a head for inserting fasteners in material to be secured, spacer blocks for holding said head, said blocks being interchangeable to vary the position of said head, said head being also adjustable in the direction of the planes of said blocks, and operating means for said head arranged to cooperate therewith in the various positions of adjustment thereof.

9. In a box making machine, a horizontally arranged head for inserting fasteners in material to be secured, said head being adjustable in a vertical direction, and means for positioning said head laterally in different predetermined positions for the different vertical positions of said head.

10. In a box making machine, a horizontally arranged head for inserting fasteners in material to be secured, interchangeable spacer blocks for holding said head in adjusted positions vertically, means cooperating with said spacer blocks for holding said head in adjusted positions laterally, and an operating device for said head arranged to cooperate therewith at various positions of adjustment thereof.

11. In combination, a head for inserting fasteners in material to be secured, means for holding said head in various positions of adjustment both vertically and laterally, and an operating device for said head arranged to cooperate therewith in positions of adjustment thereof along an inclined line.

12. In a box making machine, a plurality of sets of spacer blocks arranged adjacent one another and having the edges thereof positioned at an angle to one another, fastener heads secured in position by said spacer blocks, the head held by one set of said blocks being arranged at an angle to the head held by the other of said sets of blocks.

13. In a box making machine, a pair of stapling means arranged at right angles to one another for inserting staples adjacent the corner of a box and at opposite sides of said corner, means for holding said means in different adjusted positions, and operating means arranged to cooperate with said means in their various positions of adjustment.

14. In a box making machine, a head for inserting fasteners into the portions of a box to be secured together, a reciprocating slide for operating said head, and means controlled by said slide for positioning the box at the time that it is operated upon by said head.

15. In a box making machine, a stapling head, means for holding said head in various adjusted positions, a reciprocating plunger for operating said head, means for connecting said plunger with said head at the various positions of said head, and means controlled by said plunger for positioning the work to be operated upon by said head at the time said head operates to insert a securing device into said work.

16. In a box making machine, a reciprocating plunger, a stapling head, means for securing said head in adjusted positions relative to said plunger, a projection carried by said plunger and arranged to cooperate with said head for operating the same at the various positions thereof, and a stop for the work to be operated upon movable into operative position by said plunger simultaneously with the operation of said stapling means.

17. In combination, a self-contained stapling head comprising a supporting member having staple forming and driving mechanism thereon and forming with said supporting member a detachable unitary device, operating means for said forming and driving mechanism, means for positioning the work to be operated upon by said head, said head being movable relative to said operating means to adjust its position relative to said work, means for holding said head in various adjusted positions, and means for connecting said head with said operating means at the various positions of adjustment of said head.

18. In a stapling head, a casing constituting a supporting frame for the operating parts of said head, a plunger arranged to reciprocate within said casing, means for feeding a wire into said casing, means carried by said plunger for forming a portion of said wire into a staple, a lever pivoted within said casing and controlled by the operation of said plunger for shifting the staple so formed laterally, and means carried by said plunger for driving said staple after it has been so shifted.

19. In combination, a casing, staple forming mechanism within said casing, said casing having openings therein for admitting the entrance of wire thereto, a wire guide for one of said openings, and a stop for closing the other of said openings, said wire guide and said stop being interchangeable.

20. In combination, a staple-forming and driving head, continuously-operating mechanism for driving said head, wire-feeding mechanism for said head, and Geneva gearing between said continuously-operating mechanism and said wire-feeding mechanism, one element of said gearing being directly connected with said continuously operating mechanism and continuously driven thereby.

21. The combination with a stapling machine, of a stapling head therefor comprising a supporting member and staple forming and driving mechanism carried by said member, means for securing said member in different positions in said stapling machine while the forming and driving mechanism is retained in place by said member and means for operating said forming and driving mechanism in the different positions of adjustment of said head comprising disconnectible reciprocating members arranged to cooperate with one another for the different positions of said head.

22. The combination with a stapling machine, of a stapling head therefor comprising a casing, staple forming and driving mechanism arranged within said casing and forming with said casing a detachable unit, means for securing said unitary head in different positions in relation to said stapling machine and means for operating said head in said different positions.

23. The combination with a stapling machine, of a stapling head therefor comprising a channel member, staple forming and driving mechanism arranged within said channel member, means for retaining said mechanism in position in said member to constitute a detachable unitary head, and means for holding said head in various adjusted positions in said stapling machine and a reciprocating slide projecting from said head and engageable with actuating means for said head at different positions of adjustment of said head.

24. The combination with a stapling machine, of a stapling head therefor comprising a rectangular block having a channel groove therein, a plunger slidable in said groove, mechanism carried by said block and cooperating with said plunger for forming and driving staples, means for securing said block and cooperating mechanism in operative relation to one another independent of said stapling machine, and means for holding said stapling head in various adjusted positions in said machine.

25. The combination with a stapling machine, of a stapling head therefor comprising a rectangular tubular casing member, staple forming and driving mechanism connected with said casing member and forming therewith a detachable unitary stapling head, and means for securing said head in various adjusted positions in relation to said stapling machine, said securing means being adjustable to form sockets in different positions on said machine for receiving said head.

26. The combination with a stapling machine, of a detachable unitary head therefor comprising a tubular member, staple forming and driving mechanism arranged within said member, adjustable clamping means for securing said head in different positions on said machine in which positions said staple driving mechanism moves in parallel paths in the same plane or in different planes, and means for operating said head in said different positions.

27. The combination with a stapling machine, of a detachable unitary stapling head therefor comprising a rectangular tubular member, a plunger slidably mounted in said member, staple forming and driving mechanism carried by said member and operated by said plunger, means for securing said head in various adjusted positions in said stapling machine comprising clamping devices for engaging opposite faces of said head, and means for operating said head in its different positions.

28. In a stapling machine, in combination, means for forming a staple, means for shifting the staple when formed to a driving position, means for driving the staple, and means for retaining the staple forming, shifting and driving means in assembled relation to constitute a unitary, self-contained stapling head, bodily adjustable relative to said stapling machine.

29. In a stapling machine, a self-contained stapling head, bodily adjustable relative to said machine, comprising means for forming a staple, means for shifting said staple when formed, means for driving said staple, and a casing member for retaining said forming, shifting and driving means in assembled relation independently of said stapling machine to permit removal of said head and adjustment thereof as a unit.

30. In a stapling machine, a self-contained stapling head comprising means for cutting a portion from a length of wire, means for bending the severed portion to form a staple, means for shifting the staple into driving position, means for driving the staple, and means for retaining said cutting, bending, shifting and driving means in assembled relation independently of said stapling machine to permit removal of said head from said machine and adjustment thereof as a unit.

31. In a stapling machine, a self-contained stapling head, a carrier on which said head is removably and adjustably mounted, a support for said carrier on which said carrier is adjustable in a direction transverse to the plane of adjustment of said head on said carrier, and means for retaining said carrier in adjusted positions on said support.

32. In a stapling machine, a self-contained stapling head, a carrier plate on which said head is adjustably mounted, a support for said carrier plate on which said plate is adjustable in a direction transverse to the plane thereof, and means for retaining said plate in its adjusted positions on said support.

33. In a stapling machine, a stapling head, a plurality of interchangeable spacer blocks for holding said head in adjusted positions in said machine, and means for retaining said head in adjusted positions on one of said spacer blocks.

34. In a stapling machine, a stapling head, a carrier for said head, means for retaining said carrier and head in adjusted positions in said machine, and a driving device for said head arranged to cooperate therewith at the various positions of adjustment of said carrier while remaining in unadjusted relation with said machine.

35. In a stapling machine, a stapling head, a carrier for said head, means for retaining said carrier and head in adjusted positions in said machine, means for retaining said head in adjusted positions on said carrier, and a driving device for said head arranged to cooperate therewith at the various positions of adjustment of said head and carrier while remaining in unadjusted position in relation with said machine.

36. In a stapling machine, a stapling head, a plurality of interchangeable spacer blocks for holding said head in adjusted positions in said machine, means for retaining said head in adjusted positions on one of said blocks, and a driving device for said head arranged to cooperate therewith at the various positions of adjustment of said head and block while remaining in unadjusted position in relation with said machine.

37. In a stapling machine, a plurality of stapling heads, each being adjustable in two directions relative to said machines, and a common driving device for said heads arranged to cooperate therewith at the various positions of adjustment thereof while said driving device remains in unadjusted relation with said machine.

38. In a stapling machine, a plurality of stapling heads, carriers for said heads, means for retaining said carriers and heads in adjusted positions in said machine, means for retaining each of said heads in adjusted positions on its carrier, and a common driving device for said heads arranged to cooperate therewith at the various positions of adjustment of said carriers and heads.

39. In a stapling machine, a stapling head, an adjustable carrier for said head, wire-feeding mechanism on said carrier and held thereby in cooperative relation with said head at all positions of said carrier, and means having a fixed position on said machine for driving said wire-feeding mechanism at the various positions of adjustment thereof.

40. In a stapling machine, a stapling head, means for holding said head in adjusted positions in said machine, wire-feeding mechanism for said head, means for retaining said mechanism in cooperative relation with said head when said head is adjusted, and means having a fixed position on said machine for driving said wire-feeding mechanism at the various positions of adjustment thereof.

41. In a stapling machine, a stapling head, wire-feeding mechanism for said head, a support for said head and wire-feeding mechanism, means for holding said head and wire-feeding mechanism in cooperative relation to one another for adjustment together relative to said support, and means for holding said head in adjusted positions relative to said feeding mechanism.

42. In a stapling machine, a stapling head, wire-feeding mechanism for said head, means for holding said head and feeding mechanism in cooperative relation to one another for adjustment together relative to said machine, means for holding said head in adjusted positions relative to said feeding mechanism, and driving means for said head and feeding mechanism arranged to cooperate therewith at the various adjusted positions thereof while remaining in unadjusted relation to said machine.

43. In a stapling machine, a stapling head, wire-feeding mechanism for said head, a carrier for said head and feeding mechanism, means for retaining said head and carrier in cooperative relation to one another for adjustment together relative to said machine, and driving means for said head and feeding mechanism arranged to cooperate therewith at the various positions thereof while remaining in unadjusted relation with said machine.

44. In a stapling machine, a stapling head, a plurality of spacer blocks for holding said head in adjusted positions on said machine, means for retaining said head in adjusted positions on one of said spacer blocks, and wire-feeding mechanism carried by said spacer block and held thereby in cooperative relation with said head at all positions of adjustment of said head.

In testimony whereof I have signed my name to this specification on this 20th day of July, A. D. 1920.

MICHAEL J. MILMOE.